United States Patent [15] 3,648,119

Van Eeck [45] Mar. 7, 1972

[54] SOLID-STATE DEVICES FOR PERFORMING SWITCHING FUNCTIONS AND INCLUDING SUCH DEVICES HAVING BISTABLE CHARACTERISTICS

[72] Inventor: Philippe F. Van Eeck, 11827 Kearsarge Street, Los Angeles, Calif. 90049

[22] Filed: Sept. 22, 1969

[21] Appl. No.: 859,618

Related U.S. Application Data

[63] Continuation-in-part of Ser. No. 657,304, July 31, 1967, which is a continuation-in-part of Ser. No. 453,089, May 4, 1965.

[52] U.S. Cl. ............................................317/232, 307/299
[51] Int. Cl. ........................................................H01g 9/00
[58] Field of Search ....................317/230, 231, 232; 310/8.2

[56] References Cited

UNITED STATES PATENTS

| | | | |
|---|---|---|---|
| 2,972,068 | 2/1961 | Howry et al. | 310/8.2 |
| 3,376,438 | 4/1968 | Calbert | 310/8.2 |
| 3,378,705 | 4/1968 | Bacon | 310/8.2 |
| 3,403,271 | 9/1968 | Labdell et al. | 310/8.2 |
| 3,466,508 | 9/1969 | Booe | 317/230 |

*Primary Examiner*—James D. Kallam
*Attorney*—Mahoney, Miller & Stebens

[57] ABSTRACT

A family of solid-state current limiters and other solid-state devices comprising a plurality of oriented unbalanced dipoles taken from two groups of conductive particles and encapsulated within a hardened dielectric matrix. One group of conductive particles is selected from the group of elements having an even number of electrons in its outer shell and having a magnetic moment. The other group of conductive particles is selected from the group of elements having an odd number of electrons in its outer shell and includes those oxides and sulfides of those metals having an odd number of outer shell electrons in their molecular combination.

16 Claims, 19 Drawing Figures

Patented March 7, 1972

3,648,119

8 Sheets-Sheet 1

INVENTOR.
PHILIPPE F. VAN EECK
BY
MAHONEY, MILLER & RAMBO
BY [signature]
ATTORNEYS INVENTOR.
PHILIPPE F. VAN EECK
BY
MAHONEY, MILLER & RAMBO
BY Wm. V. Miller
ATTORNEYS INVENTOR.
PHILIPPE F. VAN EECK
BY
MAHONEY, MILLER & RAMBO
BY Wm. V. Miller
ATTORNEYS Patented March 7, 1972 3,648,119

8 Sheets-Sheet 4

INVENTOR
PHILIPPE F. VAN EECK
BY
MAHONEY, MILLER & RAMBO
BY Wm. V. Miller
ATTORNEYS

VOLTAGE - CONTROLLED DEVICE

CURRENT - CONTROLLED DEVICE

BISTABLE SWITCH STARTING IN "ON" STATE

BISTABLE SWITCH STARTING IN "OFF" STATE

BISTABLE SWITCH TRANSITING BETWEEN TWO STABLE STATES

INVENTOR.
PHILIPPE F. VAN EECK
BY
MAHONEY, MILLER & RAMBO
BY Wm. V. Miller
ATTORNEYS INVENTOR.
PHILIPPE F. VAN EECK
BY
MAHONEY, MILLER & RAMBO
BY Wm. V. Miller
ATTORNEYS INVENTOR.
PHILIPPE F. VAN EECK
BY
MAHONEY, MILLER & RAMBO
BY Wm. V. Miller
ATTORNEYS

INVENTOR.
PHILIPPE F. VAN EECK
BY
MAHONEY, MILLER & RAMBO
BY
ATTORNEYS

SOLID-STATE DEVICES FOR PERFORMING SWITCHING FUNCTIONS AND INCLUDING SUCH DEVICES HAVING BISTABLE CHARACTERISTICS

GENERAL DESCRIPTION

This application is a continuation-in-part of copending application, Ser. No. 657,304, filed July 31, 1967, entitles PROCESS FOR MAKING SOLID-STATE CURRENT LIMITERS AND OTHER SOLID-STATE DEVICES which is a continuation-in-part of application, Ser. No. 453,089, filed May 4, 1965, entitled PROCESS FOR ORIENTATION OF CONDUCTIVE PARTICLES IN PLASTIC AND PRODUCTS OBTAINED THEREBY.

The present invention relates to a class or family of solid-state current limiters and other solid-state devices and, in particular, to such a class of a plurality of oriented unbalanced dipoles taken from two groups of conductive particles and encapsulated within a hardened dielectric matrix.

One group of conductive particles is selected from the group of elements having an even number of electrons in its outer shell and having a magnetic moment. The other group of conductive particles is selected from the group of elements having an odd number of electrons in its outer shell. To form the products of the present invention, these groups of materials are subjected to the simultaneous application of at least two force fields comprising an electrostatic field and a magnetic field while in a hardenable dielectric matrix. A third force field obtained from radioactive materials may additionally be utilized. It is believed that, by simultaneous subjugation of the two types of materials to the two force fields, these groups are brought into an association which forms couples or dipoles, and every dipole consists of one element selected from one group and another element selected from the other group to effect a dipole having an unbalanced electrostatic moment. In general, the class of elements comprising the first group includes iron, cobalt and nickel, all of which have strong magnetic moments and have two electrons in their outer orbits. The second class of elements comprising the second group includes silver, aluminum and copper, none of which exhibit a magnetic moment and these elements may be included in their oxide or sulfide form such as silver-oxide, copper oxide, silver-sulfide or copper sulfide.

The electrostatic force field is always of a time-varying, periodic or pulse waveform, either alternating current or pulsating direct current, and is preferably of a relatively high frequency. The magnetic force field is produced by either a permanent magnet or an electromagnet and may be shaped to focus the electrostatic force field. The optionally utilized third force field is obtained from a radioactive material. Therefore, as used herein, a force field is defined to mean an electrostatic, a magnetic or a radioactive field.

The devices of the present invention all have the common characteristics that the two groups of particles form a plurality of dipoles or electrets, wherein each of the dipoles comprises a pair of particles selected from each group, and that the plurality of dipoles are similarly oriented or polarized. When similarly oriented, the orientation of the dipoles cause any one device to have a specific ohmic path. During use, the electronic order of the orientation may be changed into another electronic order of orientation to effect a change in ohmic path. For example, one particular device encompassed by the present invention is a solid-state switch which is either conductive or nonconductive, depending upon the electronic order imposed during operation. When the switch is conductive, the orientation of the dipoles and the electronic order of the orientation presents a specific ohmic path having a specific resistance which is a function of the electrical characteristics of the particular particles, of the percentage inclusion of one group of conductive particles with respect to the other, of the size of the particles, and of the geometry of the device. When the switch is nonconductive, the electronic order of orientation is such that the characteristics of the ohmic path are that the switch has a resistance of such high magnitude that the switch effectively prevents the flow of current therethrough. In this state, the plurality of dipoles have an electronic order which is different from that of the conductive state. The switching devices of this invention may be designed to remain in either a conducting or nonconducting state, with or without the application of power, unless specifically subjected to circuit conditions intended to cause a change of state or to always revert to one state.

It is theorized that the orientation of the dipoles undergoes a change in configuration from one electronic order to another electronic order, possibly by a technique of electronic dipole rotation. Because of the varying configurations of the electronic orders of orientation of the dipoles to cause the switch to be either conductive or nonconductive, the dipoles may be said to show order-disorder states, that is, the orientation of the dipoles undergoes a transition from one electronic order to another electronic order (or disorder). In both the conductive and nonconductive states of the switch, the electronic orders are highly stable and can transit only under specified conditions.

Each such switch has a specific power rating which is determined primarily by the total or bulk resistance of the dipoles and the thermal, mechanical and electrical characteristics of the matrix material. The bulk resistance, in turn, as stated above, is determined by the combined electrical characteristics of and interactions between the particular particles employed, their atomic weights, their particle size, and the respective percentages of each group of particles. In order to change the orientation of the dipoles in a switch from a conductive electronic order to a nonconductive electronic order, an overload current must be supplied to the switch, which overload current is determined by the switch's power rating. The overload current causes the electronic order of orientation of the dipoles to undergo an order transition so that the switch becomes nonconductive. Thus, the conductive switch is current controllable. Since the resistance in the nonconductive state is of extremely high magnitude, no effective current may pass through the switch. To reorder the orientation of the dipoles in the switch from nonconductive ohmic paths to conductive ohmic paths, it is necessary to supply a specific value of voltage to the dipoles to reestablish the conductive order. Thus, the nonconductive switch is voltage controllable. This voltage is also determined by the power rating and the "turn on" power is comparable to the "turn off" power. However, if the same voltage were consistently supplied to the switch, at the point where it becomes fully conductive because the conductive order of dipole orientation is effected, the device would automatically turn off again due to current overload from the voltage source through the conductive paths. Therefore, it is necessary to employ current limiting means, such as a resistor, so that the total value of voltage across the switch decreases as soon as the dipoles resume their conductive order.

A switch may be provided with particles of radioactive materials of varying percentages with respect to the total amount of conductive particles. With a small percentage of radioactive particles, the switch dipoles then become more easily resettable from their nonconductive order to their conductive order. With a larger percentage of radioactive particles, the switch will automatically become conductive upon removal of the cause of overload current. By means of this inclusion, the turn-on power is thus materially reduced or lessened with respect to the turnoff power. In addition, the radioactive particles enable the device to operate at a working voltage which is lower than that had no radioactive particles been employed. The radioactive particles also enable pressure-sensitive and temperature-sensitive devices of this invention as well as the current-limiting devices to exhibit good linear characteristics and small hysteresis with a high gauge factor (change in resistance per unit change in input).

These devices are also useful for other applications with or without the inclusion of radioactive particles. For example, the supporting matrix material may be of a type sensitive to heat so that it will interact with the conductive dipole paths in such a way as to result in a device which possesses a temperature dependence of current flow. The two groups of particles, if oriented and formed into dipoles in a matrix having at most a low coefficient of thermal expansion, for example, quartz, produce a device which has a negative coefficient of resistance with temperature, i.e., the resistance varies inversely to a change of temperature. By adding sufficient nonconductive material having a positive temperature coefficient of resistance to the matrix, the device may be made to have a resistance which does not vary with a change of temperature or which will increase, that is, the resistance will be stable or will increase in direct proportion to a change in temperature. Such positive temperature-coefficient resistance materials include aluminum oxide and silicon carbide.

On the other hand, the matrix may be sufficiently mechanically deformable to also affect the conductivity of conductive dipole paths so that the resistance will change upon application of even minute pressures, thereby causing a change in flow of current.

It is possible to produce each one of the devices as well as every other device which is formed from a plurality of such oriented unbalanced dipoles by means of the process described in the copending application, Ser. No. 657,304. Basically, two groups of conductive particles are mixed in specified proportions with, if desired, a specified percentage of radioactive material. One group of conductive particles is chosen from those elements of the Periodic Table having even numbers of electrons in their outer shells and possessing a magnetic moment which is capable of being influenced by a magnetic field. The other group of conductive particles is chosen from those elements of the Periodic Table having odd numbers of electrons in their outer shells or a conductive oxide or sulfide compound also having an odd number of electrons. The two groups of conductive particles are thoroughly and uniformly mixed with an uncured or unbonded dielectric matrix material. The mixture or a portion thereof is then compressed mechanically, if needed, and is placed within an apparatus designed to exert an electrostatic force field and a magnetic force field upon the mixture. At the same time, the matrix material is hardened.

The electrostatic force field is of a time-varying, periodic or pulse waveform, either an alternating-current field or a pulsating direct current field, preferably of high frequency. The magnetic force field may be generated by either a permanent magnet or an electromagnet, the use of one or the other depending upon the facilities available, the amount of concentrated force needed to be exerted upon the particles or the degree of interrelationship desired with respect to the electrostatic force field and to the groups of particles.

The high-frequency electrostatic field is designed to include the frequency or frequencies and their corresponding harmonics which correspond to one or more harmonics of the natural frequency or frequencies of the particles of both groups. When the high-frequency electrostatic field, in combination with the magnetic field, is attuned to the harmonics of the natural frequency of the particles, the particles resonate to facilitate formation of the dipoles or electrets comprising one of each of the particles, perhaps by a factor of electron spin resonance which is dependent upon a proper balance between the magnetic field and the electrostatic field. Since it is extremely difficult to obtain an exact attunement between the high-frequency electrostatic field and the frequency at which the particles will resonate, the high-frequency electrostatic field may be designed to include several high frequencies which are very rich in harmonics, among which is the proper tuning frequency or frequencies for the particles.

In addition to causing the particles to resonate, the electrostatic force field charges the particles of both groups with different electrostatic charges so that the particles of one group will have a charge and an electrostatic force which is different from the charge and electrostatic force of the particles of the other group. For these purposes, the maximum possible voltage without flow of current is applied to the particles and the high-frequency electrostatic force field may be either an alternating current field or a pulsating direct current field. A high frequency, pulsating direct-current field is preferable, in general, over the alternating-current field, because the pulsating direct current field results in a higher peak voltage than the alternating-current electrostatic field.

At the same time that the particles are acted upon by the high-frequency electrostatic field, a magnetic force field is applied which orients the magnetic particles. The magnetic force field is produced by either a permanent magnet or electromagnet. It is believed that the magnetic force field and the electrostatic force field further cooperate so that the magnetic field further forms the electrostatic force field in such a manner that the electrostatic field follows or is caused to follow the lines of force, i.e., the flux lines of the magnetic force field. Such forming may be accomplished by appropriately shaping the pole pieces of the magnet in a manner which is similar to the methods used in the well-known cathode-ray tube art. Thus, although the magnetic force field would otherwise form the particles having a magnetic moment into a contacting magnetic orientation, the electrostatic field creates an electrostatic repulsive force between the like particles of the one group and between the like particles of the other group and an electrostatic attractive force between the dissimilar particles of the two groups. Thus, the particles of one group are caused to alternate with the particles of the other group. By balancing the power of one field to the other field, the magnetic force attracting magnetic particles is balanced by the repulsive electrostatic force between similar particles and the attractive electrostatic force between dissimilar particles. The matrix material is cured, hardened or set during the forming and orientation steps to help stabilize the position of the formed and oriented dipoles.

A third force field, obtained from radioactive material, may be applied to the particles during formation and orientation of the dipoles, especially when it is desired to utilize the properties of such radioactive materials during use of the fabricated current-limiting device. The radioactive force field acts as a booster by inducing ionization of the conductive particles and by causing the formation of free electrons. In acting as a booster, the radioactive force field permits the use of lower potentials in the high frequency electrostatic field and hastens the formation of dipoles.

It is, therefore, an object of the present invention to provide a class of current-limiting devices.

Another object is the provision of such a class of devices comprising oriented dipoles including formed and oriented conductive particles.

Another object is to provide a class of current limiting devices having order-to-order transitions of oriented dipoles of conductive particles.

Another object is the provision of such a class of devices fabricated by utilizing an electrostatic force field and a magnetic force field, to which a radioactive force field may be added.

Another object is to provide a class of solid-state switches.

Another object is to provide a class of heat-sensitive devices or switches.

Another object is to provide a class of pressure-sensitive devices or switches.

These and other objects, as well as a more complete understanding of the present invention, will become more apparent with reference to illustrative embodiments of the present invention, wherein.

Figure 3:
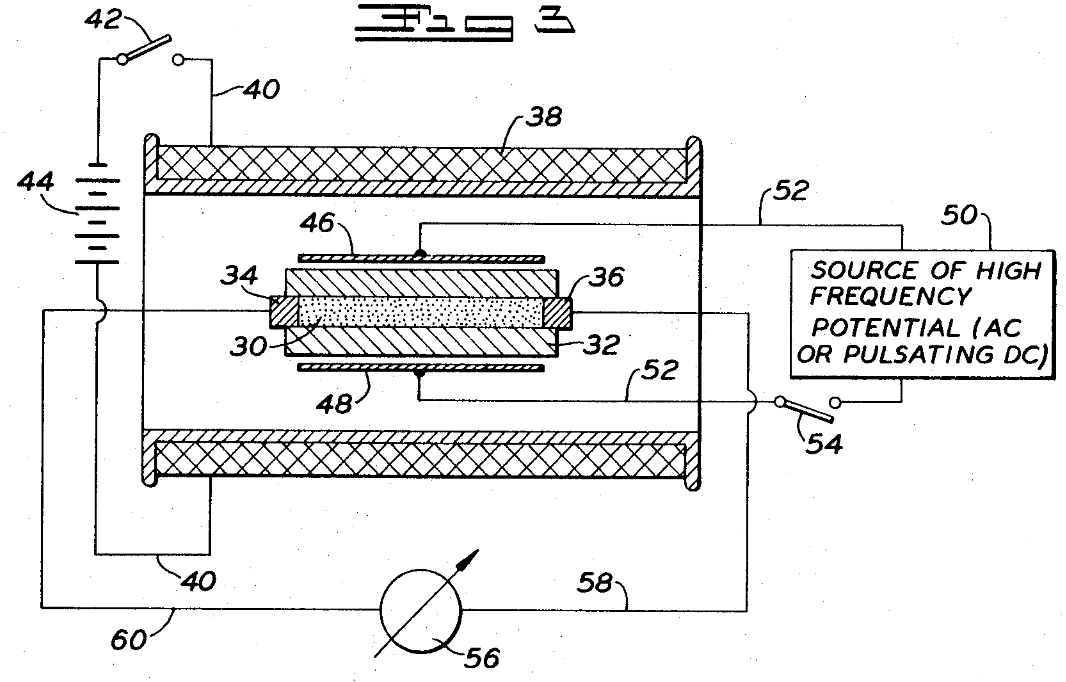
FIG. 3 is a schematic view of one apparatus for forming and orienting conductive particles in a dielectric matrix utilizing a high-frequency electrostatic force field disposed 90° from a magnetic force field produced by an electromagnet.
Figure 4:
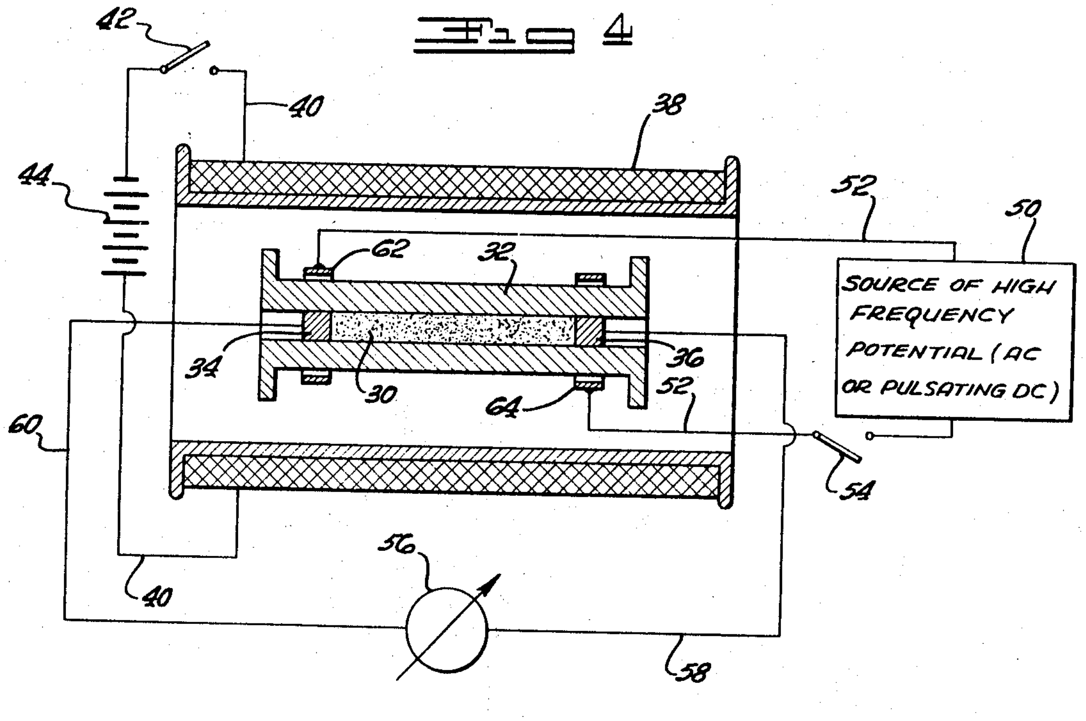
FIG. 4 is a schematic view of another apparatus for forming and orienting conductive particles in a dielectric matrix utilizing a high-frequency electrostatic force field and disposed colinearly with a magnetic force field produced by an electromagnet.
Figure 5:
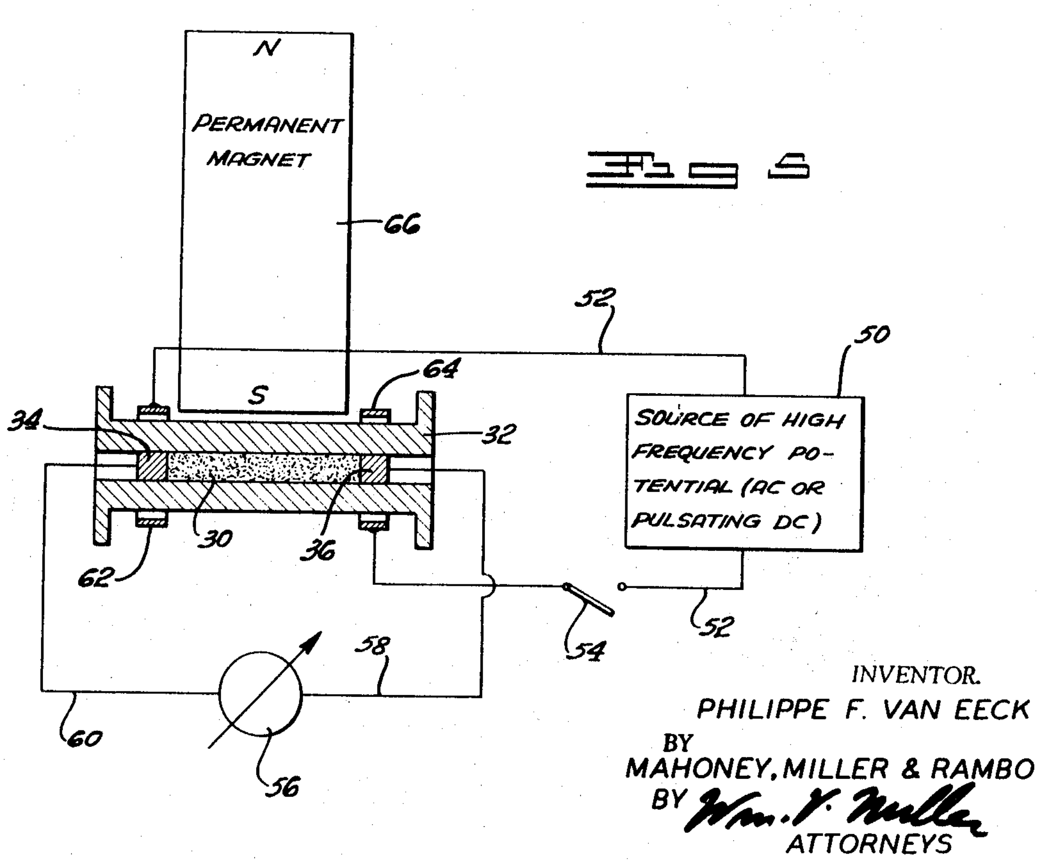
Figure 6:
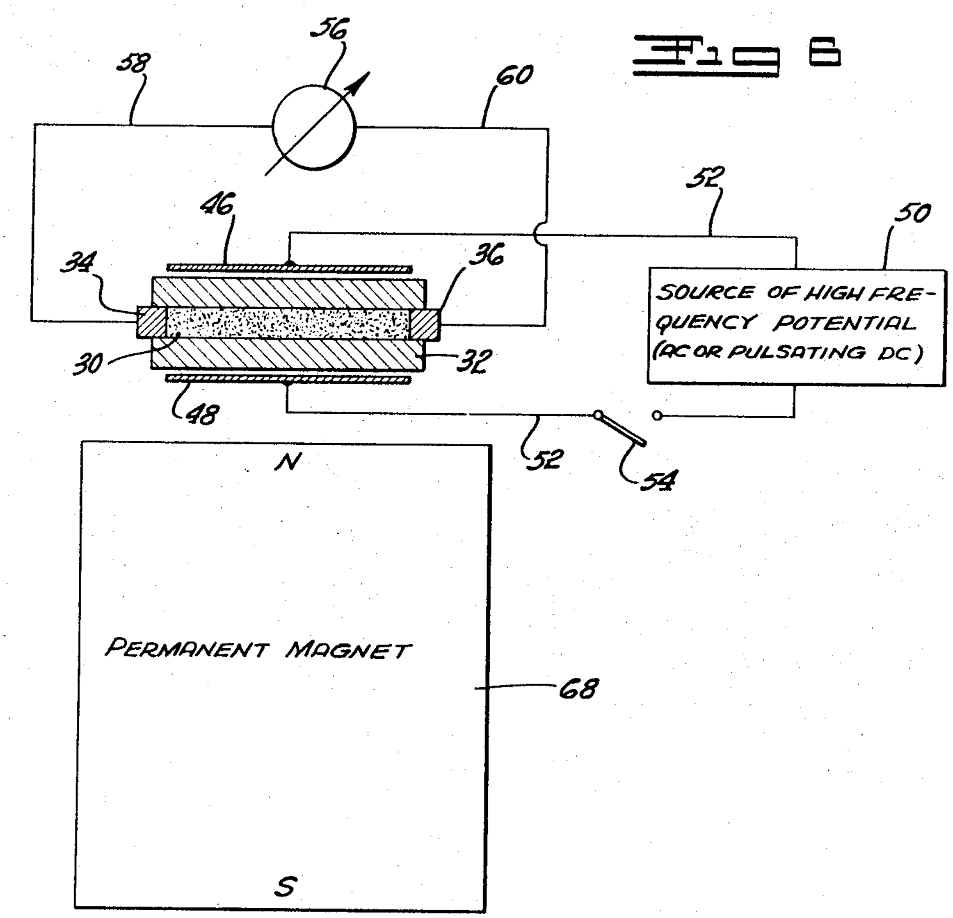
Figure 8:
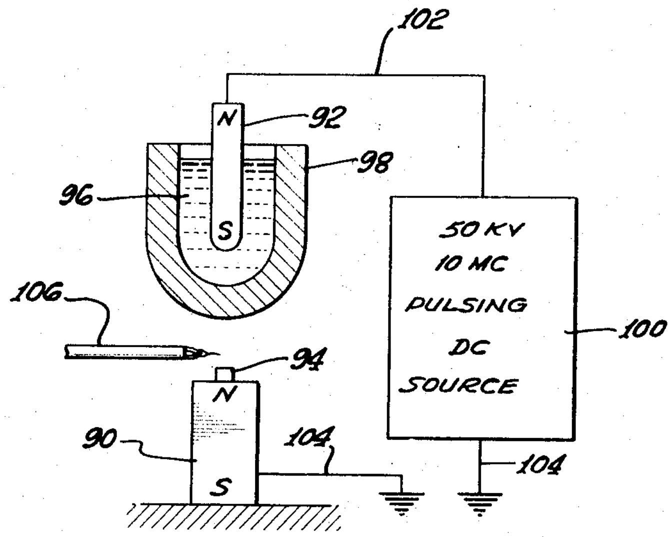
Figure 7:
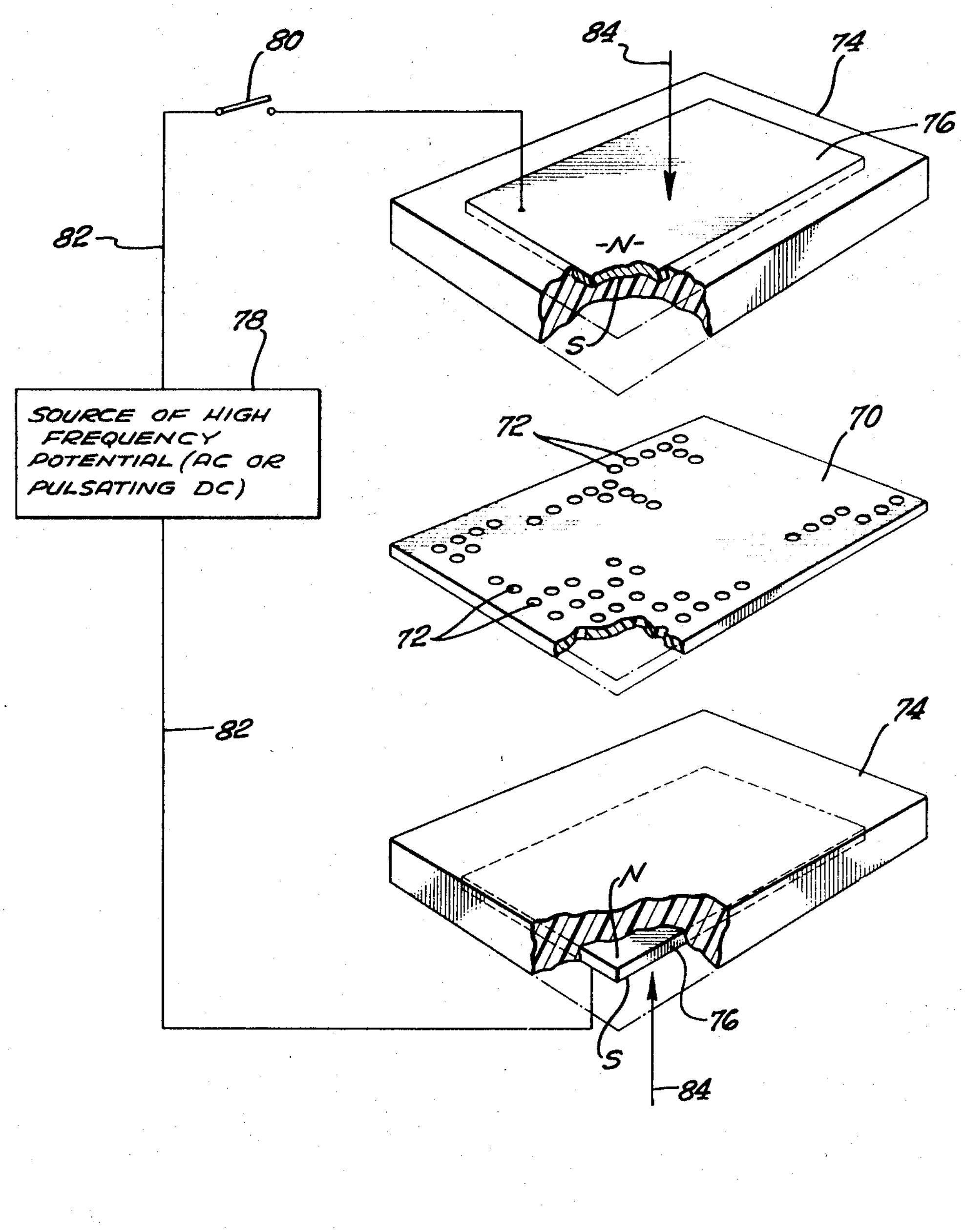

FIGS. 5 and 6 are variations, respectively, of the apparatus depicted in FIGS. 3 and 4 wherein the electromagnetic force fields are replaced by permanent magnet force fields, the variations among FIGS. 3–6 being illustrative both of the interchangeability of permanent and electromagnetic force fields and of the change of directions between the magnetic force fields and the electrostatic force fields;

FIG. 7 is an exploded view of the apparatus, partly in section, illustrating a high-frequency electrostatic field and a permanent magnet field for producing a plurality of current-limiting devices; and FIG. 8 is a view of a specific apparatus for producing a current limiting switch.

Figure 9A:
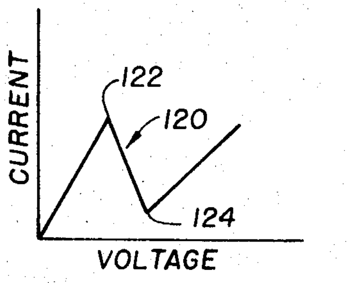
Figure 9B:
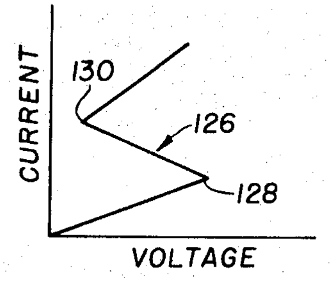

FIGS. 9*a* and 9*b* are voltage-current curves of prior negative resistance devices which are respectively voltage controlled and current controlled.

Figure 10:
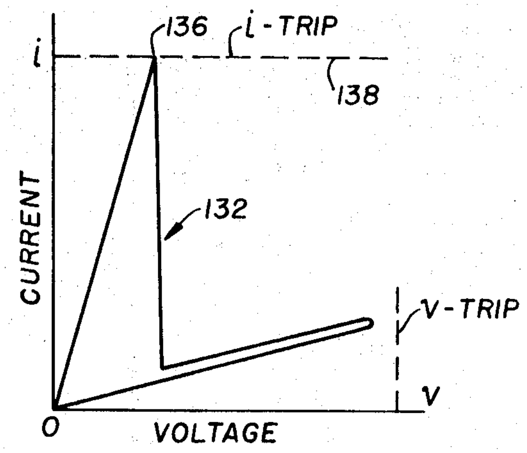
Figure 11:
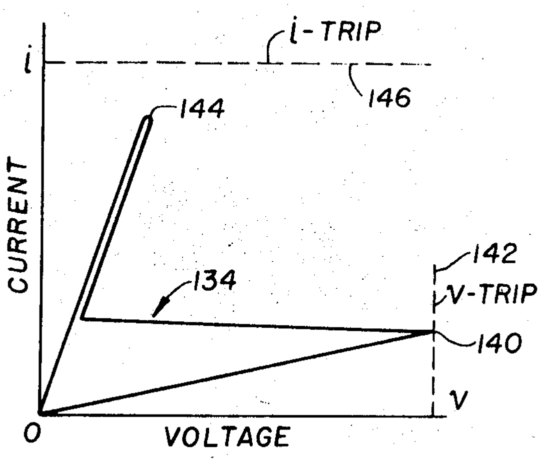
Figure 12:
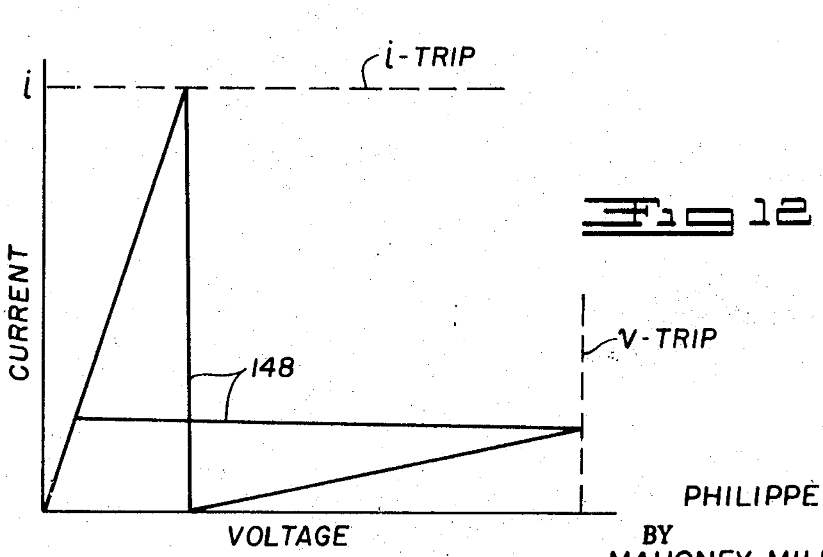
Figure 13:
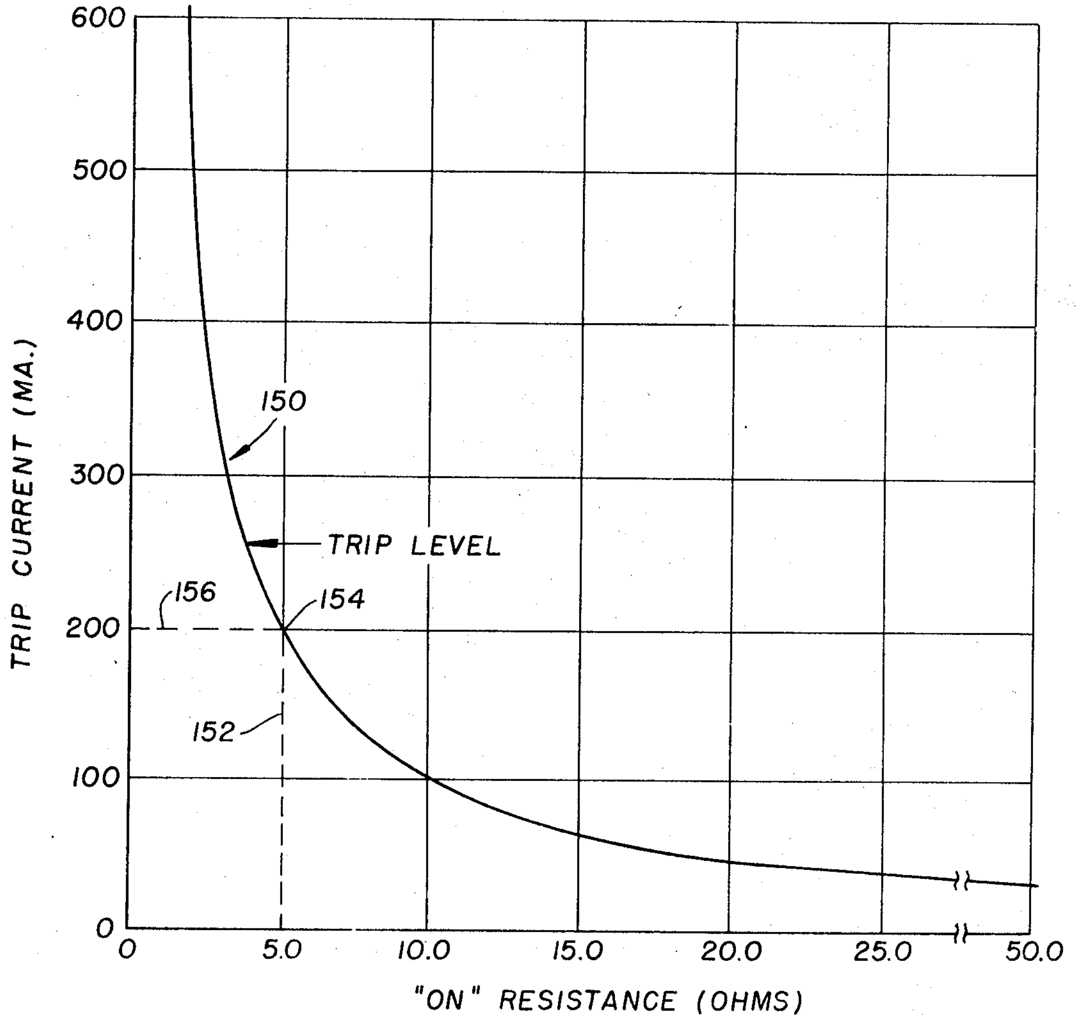
Figure 15:
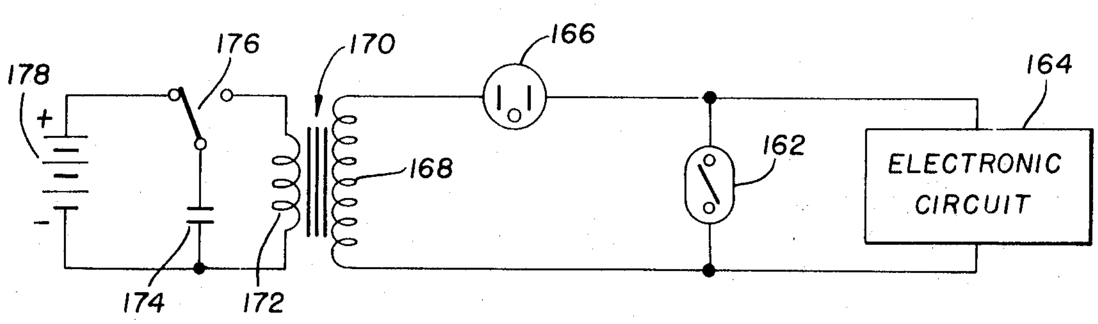
Figures 14, 15:
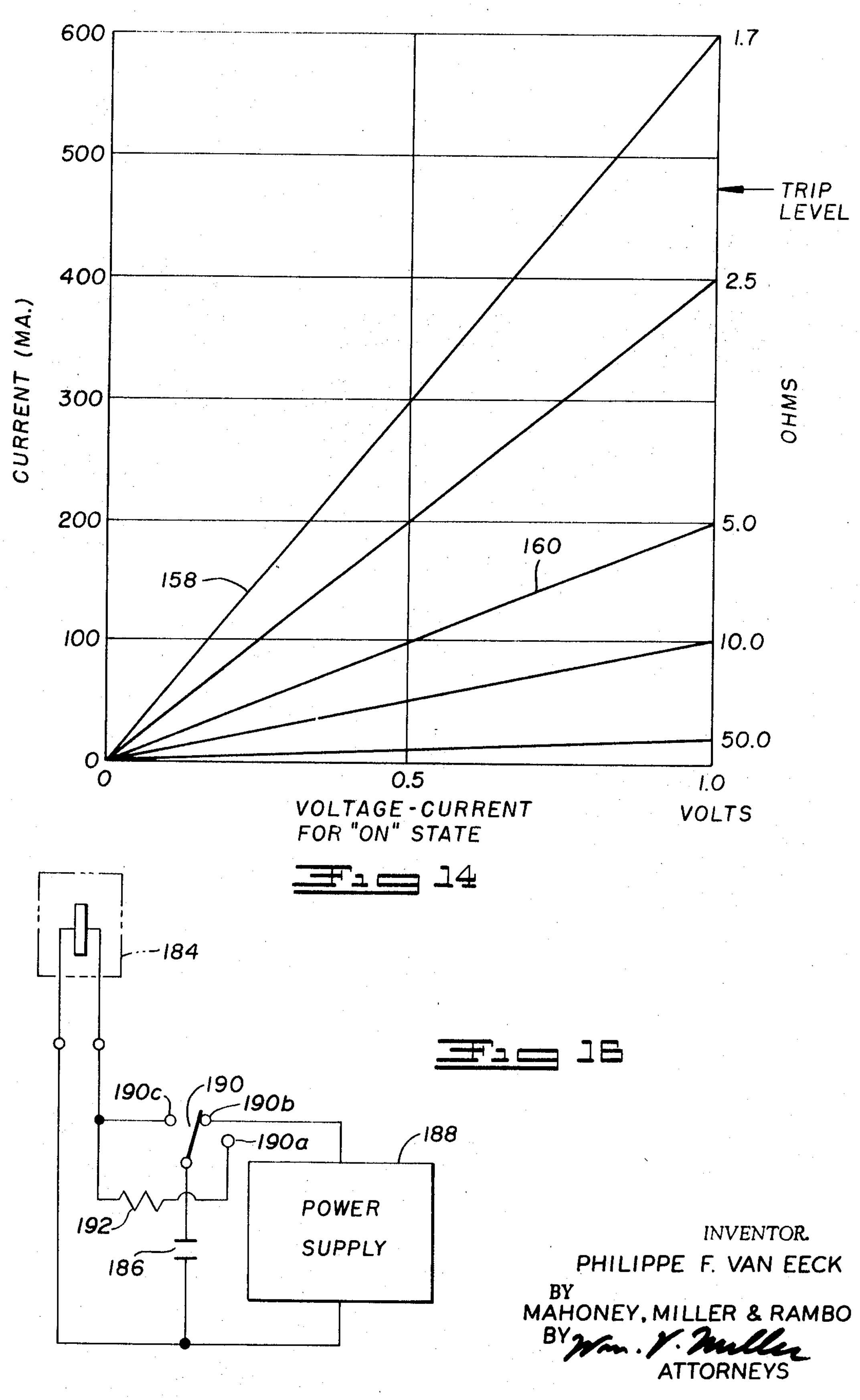

FIG. 10 is a voltage-current plot of an embodiment of the present invention comprising a negative resistance switch which, in its conductive state, is current controllable;

FIG. 11 is a voltage-current plot of the embodiment of FIG. 10 comprising a negative resistance switch employing current limiting means which, in its nonconductive state, is voltage controllable;

FIG. 12 is a composite plot of the two curves depicted in FIGS. 10 and 11, absent the current-limiting means of FIG. 11;

FIG. 13 is a current-resistance or impedance plot of the trip level of the current-limiting switch having the curves depicted in FIGS. 10–12;

FIG. 14 is a current-voltage-resistance of impedance plot of the current limiting device of FIGS. 10–13 in its conductive states;

FIG. 15 is a view of one embodiment of the present invention comprising a resettable current limiting switch associated with an electronic circuit; and FIG. 16 is a view of a mechanism by which an embodiment of the present invention comprising a squib or resettable switch may be placed in operation and detonated.

Figure 17:
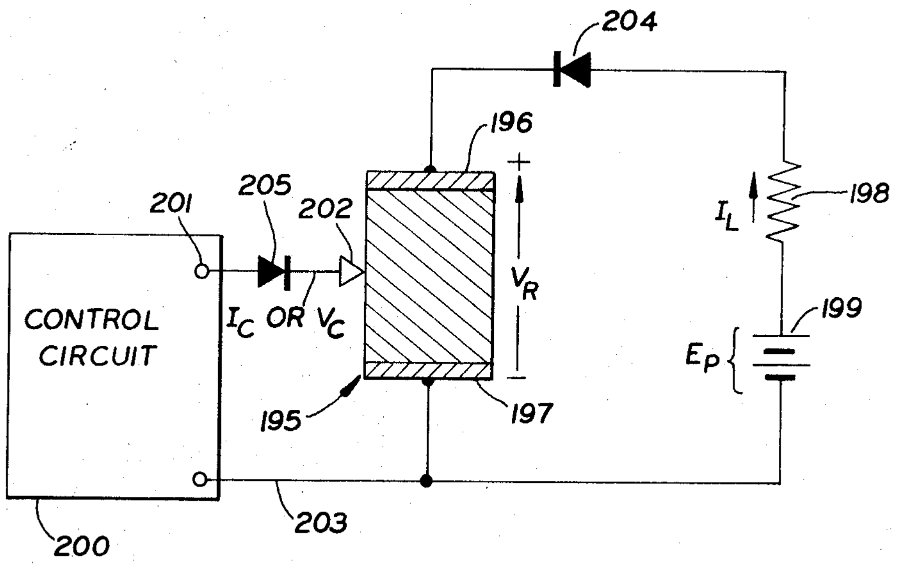

FIG. 17 is a schematic diagram of a circuit having a three terminal embodiment of a switching device interconnected therein and a selectively operable switching control circuit.

Figure 18:
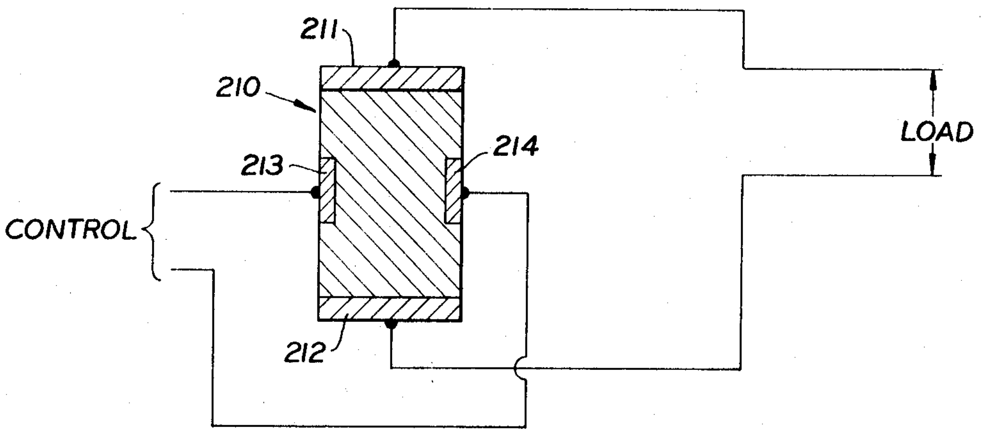

FIG. 18 is a diagrammatic illustration of a four-terminal embodiment of a switching device and indicating control and load circuit terminals.

Figure 1:
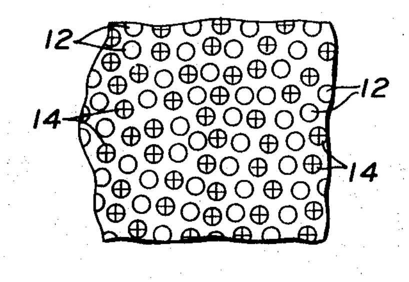
FIG. 1 is a view of a two-dimensional theoretical model of a plurality of particles before the formation and orientation of dipoles.
Figure 2:
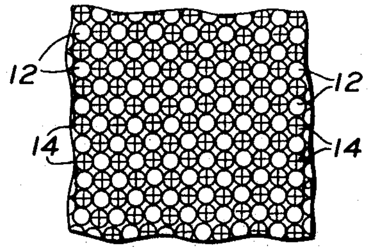
FIG. 2 is a view of a two-dimensional theoretical model of a plurality of oriented dipoles formed under double orientation by means of electrostatic and magnetic fields.

Accordingly, with respect to FIGS. 1 and 2, a theoretical model of a typical current-limiting device is depicted as two-dimensional; however, it is to be understood that the following discussion is appropriate to three-dimensional theoretical models and that an actual embodiment of a device would normally be three-dimensional. In addition, the following discussion is directed toward a simplified understanding of the interaction between conductive particles at the domain level and, as set forth, the discussion is an attempt to explain a present theory of such current-limiting devices, which discussion is based upon current theoretical hypotheses. Therefore, future investigations, experimentation and data may indicate a revision of the following explanation. Regardless, however, of the explanation regarding the theoretical model depicted in FIGS. 1 and 2, the apparatus depicted in FIGS. 3–8 is illustrative of the mechanisms by which the present invention may be formed.

FIG. 1 depicts a cross section of a mixture of conductive particles in an uncured or unset dielectric matrix material. One group 12 of conductive particles is illustrated as open circles and represent that group which is selected from the group of elements of the Periodic Table having an even number of electrons in its outer shell and having a magnetic moment. A second group 14 of conductive particles is illustrated as circles with a cross and the second group is selected from the group of elements of the Periodic Table having an odd number of electrons in its outer shell. It is to be understood that the relative sizes of the circles which represent the two groups does not indicate the respective atomic weights or particle size, or the like. Groups 12 and 14 are selected in such a manner that the formed and oriented finished device is provided with a specific conductivity. This conductivity is predicated upon the particular two elements which constitute the two groups, the percent inclusion of one group of particles to the other group of particles, the material and percentage inclusion of the dielectric matrix and the geometry of the device. For example, a combination of 40 percent cobalt and 60 percent silver in a glass matrix provides a resistance of less than 5 ohms.

The two groups of conductive particles are formed into dipoles and the dipoles are oriented with respect to each other as shown in FIG. 2. In order to form dipoles or electrets, the individual particles comprising both groups must be simultaneously operated upon by a magnetic field and a high-frequency time-varying electrostatic field of periodic or pulse waveform. The electrostatic field may be aided by the inclusion of a small percentage of radioactive material which ionizes the conductive particles and creates an excess of free electrons so that the association of one particle from one group with another particle of the other group will be more easily facilitated than if the electrostatic field acted alone. The conductive particles, for example, the particles of group 12, having a magnetic moment and an even number of electrons in the outer orbit are formed into contacting paths along the magnetic flux lines of force by the magnetic force field. The electrostatic field, as focused by the magnetic force lines, produces electrostatic force charges in all conductive particles of groups 12 and 14. Since the material forming the group 12 particles is selected to be different from the material forming the group 14 particles, the group 12 particles take on an electrostatic charge which is different from that of the group 14 particles. Conventionally, this difference of electrostatic charge is thought of as plus and minus charges; however, it is as valid to consider the difference of electrostatic charge in terms of a potential drop. Because all the particles of one group have the same charge, for example, the particles of group 12 possessing a magnetic moment, the magnetic contact between these particles is broken to form spaces therebetween by means of an electrostatic repulsion force, although these particles are still oriented in noncontacting disposition by the magnetic force field. The particles of group 14 not possessing a magnetic moment are similarly electrostatically repulsed from each other; but, because of the difference of electrostatic charge between the two groups of particles, the group 14 particles not possessing a magnetic moment are attracted to the group 12 particles having a magnetic moment. In addition, because the electrostatic field is focused by the magnetic force field, the particles not possessing the magnetic moment fill the spaces between the particles having a magnetic moment and the two groups of particles form conductive chains which follow the magnetic lines of force. It is further believed that the two groups of particles form electronic couplings as, for example, by some mechanism of electron sharing. Thus, the oriented dipoles of FIG. 2 may also contact in an alternating particle manner in two or more directions as is shown in FIG. 2.

Proper formation of the conductive chains of particles requires subjection of the mixture comprising appropriate proportions of particles of the two groups of materials along with the matrix material to simultaneous electrostatic and magnetic force fields of sufficient magnitudes to cause orientation of the particles. Particle proportions are preferably chosen in substantially equal quantities with due consideration to characteristics of the specific particles in combining with the matrix material during the formation process to result in essentially equal quantities of particles in a fabricated device.

This preferred proportion of particles is dictated by the alternating disposition of the particles in the conductive chains and an unequal proportion results in some of the particles of the one group being ineffective in forming conductive chains and perhaps interfering with resetting of the device. While the proportions of the two groups of particles are preferably chosen to be equal, the proportion of particles of both groups to the amount of matrix material may be varied over a relatively wide range to obtain a device with the desired characteristics such as current conducting rating. This will be illustrated in greater detail with respect to the examples and embodiments described hereinafter. In general, the combined proportion of particles of the two groups of materials to the matrix material is maintained within the ratio of 25–75 percent as a smaller ratio results in a device which is not readily susceptible of resetting and a larger ratio results in a device with substantially reduced structural integrity due to decreased binding effect of the matrix material. Also, increasing the ratio of particles to matrix material will normally result in a device with a higher current rating and if a device with a higher resistance is desired, the particles of a pure metal having a specific electrical resistance may be replaced with particles of a pure metal having a higher resistance or an oxide of a metal which will also have a higher specific electrical resistance.

Selection of electrostatic and magnetic force field magnitudes is best determined by experimentation with the fields being adequate to effect the particle orientation with due regard to power economy. For example, the magnetic force field may be of the order of 12,000 gauss which is approximately the saturation level for most common electromagnet materials and the electrostatic field may be of the order of 10,000 volts per centimeter. Normally the maximum magnetic force field feasible is utilized with the maximum electrostatic force field also utilized with due regard to avoidance of arcing which could perhaps burn the particles and avoidance of self-ionization during the forming process.

The particles thus form into dipoles which assume the orientation depicted in FIG. 2 wherein each dipole comprises a particle of group 12 and a particle of group 14. In addition, it will be noted that each particle of group 12 is adjacent to a particle of group 14 in each of two directions in the exemplary model of FIG. 2. The order of orientation may have any disposition and may be effected by the specific direction of the magnetic force field. However, the difference between the orders of orientation may also be used to explain how a switch, for example, may be transformed from its conductive order to its nonconductive order. FIG. 2, for example, may illustrate the conductive order of the oriented dipoles in a switch. When an overload of current flows through the switch of FIG. 2, the dipoles undergo an order transition such that the orientation or polarization is no longer the same as that shown in FIG. 2. It is to be further understood that the order-to-order transition is also theoretical and that the original orientation of the dipoles of FIG. 2 is also theoretical.

Such current-limiting devices may be obtained by use of the apparatus shown in FIGS. 3–8. In all cases, the mixture of conductive particles during the set of the dielectric matrix material are exposed to a high-frequency alternating-current of pulsating direct current electrostatic force field and a second force field effected by an electromagnet or a permanent magnet. A further force field obtained from radioactive material may be obtained by the inclusion of particles of such radioactive material within the mixture of conductive particles and matrix material. The fields form the conductive particles into a plurality of dipoles and orient the dipoles thus formed. At the same time, the matrix material is set to stabilize the desired orientation of the particles. One of the fields applied is always an electrostatic force field. Another force field, the magnetic field, may be produced by either a permanent magnet or an electromagnet. Since the formed dipoles possess magnetic and electrostatic moments, the magnetic and the electrostatic fields are able to orient the dipoles in an ordered manner. It has been found that, for the process to occur and for the product to be formed in an efficient manner, it is necessary that the frequency of the electrostatic field be in the range of a few kilocycles to several megacycles at the maximum possible voltage level of the field without arcing.

These principles may be employed to produce a specific device of the present invention embodied as a resettable solid-state switch. The switch is produced in a manner similar to that described above. Particles of conductive material, selected from each of two groups of elements according to the previously described criteria, are mixed with an uncured matrix material such as plastic, unset ceramic, etc. The particles are subjected to both a magnetic field and a high-frequency electrostatic field while the plastic or ceramic is being cured. The device is then suitable for use as a switch and is connected into the desired electronic circuit.

If the circuit begins to experience an overload, the current through the switch will rise. As the current rises, the electronic order of orientation of the dipoles is affected until, at the overload point, the order transits into another order and the current is cut off to prevent damage to any of the circuit components. It is theorized that the overload current sets off an avalanche effect such that, as some dipoles transit to the other order, the overload current creates a greater overload on the remaining dipoles. After the cause of the overload is remedied, the switch may be reset. In the case of a 1-watt switch, to return the switch to a current conductive state, a high-voltage pulse of short duration is applied to the switch with this pulse supplying power equal to one-half the wattage required to trip or switch the device from a conductive to a nonconductive state. This pulse reorients or reorders the dipoles and the switch is reset. The voltage pulse, for this purpose, may be generated by either a direct or alternating current source of power.

In some cases, it is not practicable to provide a reset power source which will deliver a voltage pulse of the power required for reset of a specific device because of space, weight or other conditions. Therefore, it is sometimes desirable to produce a switch device which is automatically self-resetting or which has a substantially reduced power requirement for reset. This is accomplished by adding appropriate amounts of a radioactive element, or oxide or compound thereof, such as thorium, uranium, cobalt or polonium and a suitable dopant to the mixture of two particle types and matrix during the forming process. It is theorized that the radioactive material produces sufficient internal ionization to aid the reordering of the dipoles in a manner similar to that effected by the high-frequency electrostatic field in order to reset the switch to its original conductive condition. A suitable dopant that may be utilized is carbon added in the ratio of 1–2 percent of the combined particles and radioactive material such as carbon is not subject to or affected by orientation and it only presents a bypass or high resistance path through the device. The dopant decreases the open circuit resistance of the device and thus decreases the minimum voltage of the power pulse required to effect resetting.

It has been found that inclusion of a radioactive material such as thorium oxide in a ratio as low as 1–2 percent will provide sufficient ionization for such a device that the voltage pulse required for reset can be reduced for the same rated device. As an example, one specific device originally requiring a 400-volt reset pulse was found to require only 80 volts when modified only to the extent of including the small proportion of thorium oxide. This 1–2 percent ratio is based on the total of conductive particles from the two groups and the radioactive particles. Such a system is useful where the resetting of the switch is not completely automatic but controllable by some operator.

There are instances where it is necessary or at least highly desireable to provide switch devices for a system which is automatically resettable as, for example, in a space vehicle that may pass through a highly radioactive belt or a field apparatus in a remote location and which may be struck by lightning. In either situation, the radioactive belt or the lightning would temporarily overload the system circuit and it would be impracticable, it not impossible, to provide an attendant or some means to reset the switch whenever necessary. Consequently, by increasing the percentage of radioactive material, for example, thorium oxide, to approximately 25 percent, the switch devices may be made self-resetting and are essentially monostable devices in that they return to a current-conductive state whenever the cause of switching to a nonconductive state is removed. Thus, a system or circuit provided with devices of this type does not need a resetting power source.

When the product desired to be made comprises a conductive squib or explosive device, such as is used to ignite a propellant ignitor filament, for example, the ingredients are placed together in the desired proportions. Gunpowder, for example, comprises the combination of carbon, sulphur and potassium nitrate. These ingredients are generally purchased in mixed condition from a supplier and are combined with iron and magnesium, antimony sulfide, barium dioxide or aluminum to adjust or to preset the temperature at which the mixture will explode as well as to set the specific value of conductance. The combination is placed within a mold with an uncured plastic under pressure to form pellets, which are conductive and which may be easily ignited by an electric current. A high-frequency electrostatic field and a magnetic field are applied while the plastic is cured or polymerized to form a solid article to stabilize the orientation of the formed and oriented dipoles. The use of a plastic matrix also provides further advantages, not only by supporting the ingredients in their oriented positions but also by protecting the particles from atmospheric conditions.

Such a squib is a solid-state switch of the general type described herein with the addition of an explosive feature. It is fabricated in its nonconductive state having a relatively high impedance. In this high-impedance state, the squib cannot be ignited. However, upon application of a current-limited, high-voltage pulse to the squib, as described above, the squib becomes conductive. Upon further application of a subsequent current pulse, the squib ignites and explodes.

The use of such an oriented conductive dipole squib device affords several advantages. Since the conductive particles are oriented in a matrix, there is little likelihood of damage to the device by vibration or shock. Its initial impedance is extremely high, in the range of 300,000 ohms, to assure its nonconductivity before a voltage pulse places the switch into its conductive state. Consequently, any premature current leakage cannot occur and effect ignition. Furthermore, a low voltage discharge, such as static electricity, would not affect the device. In addition, by changing the additives or composition, the potential level at which the explosion occurs may be varied to a large extent in contradistinction to conventional products. While prior art products may produce an ignition temperature in the vicinity of 500° C., the oriented squibs fabricated by means of the above described process can produce an ignition temperature in excess of 1,000° C.

The addition of certain materials, radioactive oxides, for example, further allows the potential supplied to the squib to be decreased by more than one-half since internal ionization aids the orientation. Such additives increase reliability even further since there is a smaller chance of internal sparking and internal damage when a lower potential is supplied.

Although the above discussion relates to the use of plastics or ceramics in its general sense, it is not necessary that the invention be restricted to any specific plastic since it is primarily a supporting means. Consequently, matrices of silicone, epoxy resin, ceramic, or any other suitable nonconductive material may be used.

Referring to FIG. 3, a mixture 30 of uncured plastic, such as a polyester resin, an epoxy resin, a phenolic resin and acetate, catalyst and conductive particles, is disposed in an insulating mold 32. A pair of electrodes 34 and 36 are positioned at each end of the mold to hold the mixture therein. A current conductive coil or winding 38 is disposed about the mixture and is connected by leads 40 and a switch 42 to a source 44 of direct current. Consequently, when switch 42 is closed, a direct current electromagnetic field will arise having lines of flux which will pass longitudinally through the axis of the mixture and the mold. A pair of flat, parallel disposed plates 46 and 48 are disposed on opposite sides of the mold, not in ohmic contact with the mixture, and are secured to a source of high-frequency potential 50 through leads 52. Source 50 produces a high-frequency, alternating-current or a pulsating direct current electrostatic field between the plates 46 and 48 when a switch 54 in one lead 52 is closed. When the connection is made to the source, a high-frequency electrostatic field arises between plates 46 and 48 and is disposed in a direction which is 90° offset from the axis of the direct current electromagnet field. An ohmmeter or other control instrument 56 is secured by leads 58 and 60, respectively, to electrodes 34 and 36 so that the process of orientation may be observed and monitored.

EXAMPLE I

The apparatus of FIG. 3 may be used to produce a bar which can be used to covert or to translate ultrasonic waves into a variable current without external amplification.

Mixture 30 may comprise particles of pure nickel powder and aluminum powder, both types of particles being of a size of 5 microns or less and being mixed with microcrystalline particles of silicon or Rochelle salt and with a matrix material of uncured plastic and the catalyst. The silicon or Rochelle salt particles are used so that the device may additionally exhibit piezoelectric characteristics.

The electromagnetic field preferably has strength of at least 10,000 gauss while the electrostatic field has a strength of at least 10,000 volts/cm. at 3 watts/cm./cm.$^2$ of bar, at a frequency of 500 kilocycles. While the plastic is being polymerized and the particles are being oriented, ohmmeter 56 is indicating the progress of the orientation in order to afford a control over the process.

With reference to FIG. 4, all the elements thereof are the same as in FIG. 3 with the exception that plates 46 and 48 for forming the electrostatic field are disposed as longitudinally spaced rings 62 and 64 coaxially to each other and the mold 32. The electrostatic field, consequently, will have a direction which is coaxial with the axis of the electromagnetic field; therefore, their angular disposition will be 0°. This form of the apparatus may also be utilized to form switching devices of this invention.

FIGS. 5 and 6 illustrate variations of the apparatus of FIGS. 3 and 5 wherein the electromagnets are replaced by permanent magnets 66 and 68 in order to depict the interchangeability of the magnetic force fields. The choice is one of force needed and the electromagnetic force fields are preferred when a high or a concentrated magnetic force is required.

FIG. 7 depicts an exploded arrangement whereby a plurality of oriented plastic-matrix switching devices may be produced by means of an alternating-current or pulsating direct current, high-frequency electrostatic field. A nonconductive forming plate 70, into which a plurality of cylindrical holes 72 are formed, is sandwiched between a pair of supporting plates 74. A pair of flat, parallel disposed plates 76 forming electrodes and which also are permanent magnets, are disposed within plates 74 and are connected to a source 78 of high-frequency potential through a switch 80 and wires 82 for forming an electrostatic field between the plates. Being permanent magnets, the plates apply a magnetic force field in the same direction as the electrostatic field. A pressure, indicated by arrows 84, may be applied while the conductive particles are being oriented and the uncured matrix material and catalyst are coacting.

The apparatus of FIG. 7 is useful when a plurality of oriented articles are to be made and the fields comprise a high-frequency electrostatic alternating-current force field and a permanent magnet force field arranged to operate along the same axis. It is to be understood that an electromagnetic force field is also applicable instead of the permanent magnet force field in the FIG. 7 process, and the apparatus may be used to form resettable switches and squib devices.

EXAMPLE II

A 200-milliwatt resettable switch having a resistance of 5 ohms and a trip current of 200 milliamperes was prepared by means of the apparatus illustrated in FIG. 8. An unhardened matrix material was prepared from silicon dioxide, sodium fluoride, and calcium fluoride of respective percentages by weight of 70, 15 and 15 percent. These matrix materials were thoroughly mixed. The two groups of particles comprised cobalt and silver of respective percentages by weight of 40 and 60 percent. To the mixture of particles was added 2 percent radioactive thorium oxide to 98 percent of the mixture of cobalt and silver. This mixture was thoroughly combined in a turning barrel. Forty percent of the cobalt-silver-thorium-oxide mixture was combined with 60 percent of the matrix material and the two were thoroughly combined in a turning barrel.

The total mixture was then mechanically compressed into the desired form of the finished switch, which in this example was configured as a disc having a diameter of 2.5 millimeters and a thickness of 1 millimeter, thereby effecting a switch having a maximum heat dissipation surface of 5 mw./mm.$^2$. For a 10-ampere current limiting switch formed from 25 percent ceramic matrix and 75 percent cobalt-silver mixture of a 40–60 percent respective ratio, the switch had a diameter of 20 millimeters and a thickness of 1.5 millimeters to provide a power rating of 10 watts and a heat dissipation of 5 mw./mm.$^2$ of surface. It is to be understood that other sizes and other parameters are possible, as suggested in the following table:

0010 NO CARD FOR THIS ILLUSTRATION.

The apparatus depicted in FIG. 8 was also utilized to produce a current-limiting switch. A pair of permanent magnets 90 and 92 were arranged so that the north pole of one was positioned proximate to the south pole of the other. Magnet 90 was used to support a compressed tablet 94 formed from the above materials. Magnet 92 was placed in an insulating oil bath 96 within a quartz receptacle 98. In addition, magnets 90 and 92 were utilized as electrodes for a pulsating direct current power source 100 which was connected to magnetic electrodes 90 and 92 by leads 102 and 104 thus forming an electrostatic field between the electrodes. A torch 106 was arranged adjacent to tablet 94 in readiness to bake or fuse the dielectric matrix material of the tablet.

The tablet was then placed on magnet 90 and the thermally insulated magnetic electrode 92 was placed above the tablet. A 50-kilovolt pulsing direct current electrostatic field at 10 megacycles was provided between the electrodes. The permanent magnet had a field force of 6,000 gauss. After the pulsing direct-current electrostatic and magnet fields were established, the tablet was heated by torch 106 to cause baking or fusing of the matrix material. In another switch forming operation, an electromagnet replaced the permanent magnets.

In another switch-forming operation similar to that described in Example II, the matrix comprised a plastic rather than a glass ceramic, and the heat dissipation was 2 mw./mm.$^2$ of surface. Here, 50 percent of a 40 percent cobalt–60 percent silver mixture and 50 percent plastic matrix provided a 50 mw. switch having a switching characteristic of 50 ma. and a resistance of 20 ohms at 20° C. When the temperature was raised to 100° C., the resistance rose to 40 ohms and the trip current was 25 ma.

Other combinations of conductive particles selected from the two groups are possible and other types dielectric matrix material may also be used so that a wide variety of current limiters and other devices may be obtained. The use of particular conductive particles a their relative percent inclusion to each other and to the matrix material are the primary means by which the different devices having different purposes are produced. The conductivity of a current limiter may be increased by raising the percentage of conductive particles to that of the matrix material and/or by increasing or utilizing a group of particles which has a high value of conductivity, the final result being dependent also upon the desired power rating of the device. Thus, for a low-power current limiter, a relatively low percentage of conductive particles to dielectric material is used. Conversely, a larger percentage of conductive particles of both groups is used for a high-power device and also for current limiters of large size. In such high-power devices, silver and copper preferably are also utilized so that heat dissipation requirements will be lowered by decreasing the device's internal resistance. Because the extreme range and variation of current limiters having different results is dependent primarily upon the above factors, it is impossible to list every such variation. However, further examples of such current limiters may be set forth by listing several elements for each of the two groups, although it is to be understood that this partial listing is illustrative. The group of particles having an even number of outer orbit electrons and a magnetic moment includes elements such as iron, cobalt and nickel. The other group of particles having an odd number of electrons in its outer orbit includes elements such as silver, aluminum and copper. For example, 25 percent cobalt and 20 percent copper mixed with 55 percent glass matrix and exposed to an electrostatic field of 10,000v./cm. at 500 kc. and a magnetic field of 6,000 gauss (depending upon the size of the device) results in a current limiter having a resistance of 0.5 ohm and a trip current of 5 amps. These and other constituents may be mixed in any order and with varying percentages to produce a current limiter or other device having the desired results.

For all devices made by the processes and apparatus described above, in order to make them applicable for use in electronic circuitry, each device was coated on two surfaces, preferably by a vacuum deposition process, with a conductive metal which was inert with respect to the matrix material and which could be deposited at a temperature which would not affect the device. Other well known methods of attaching or forming contact electrodes with the devices may also be utilized.

With the above description of the theoretical model, the process, and several inventive devices, the following description is presented to set forth a generalized physical model of a bistable switch along with voltage-current characteristics thereof. It will be obvious upon a study thereof that the substitution of different conductive particles and/or radioactive materials will produce current-limiting devices of different characteristics.

The bistable switches, as exemplary of one embodiment of the present invention, are capable of assuming either of two stable resistance states, low and high, with a ratio of $10^7$ to 1 in impedance between the two states. The low-resistance state is designable to range from fractions of an ohm to several kilohms while the high-resistance state generally exceeds 100 megohms, an open circuit for all practical purposes. Switching is rapid, ranging from the submicrosecond region to below the subnanosecond. Once switched, the devices are highly stable and remain in either the conductive or the nonconductive state indefinitely with or without applied power. As such, they constitute a nondestruct, nonvolatile memory. Such devices may be as small or smaller than 5 mils in thickness and 25 mils in diameter and are capable of switching diverse power loads for their size, such as a range of current ratings from 0.001 to 10 amps and of voltage ratings from 20 to 2,500 volts. Such switches are designable to exhibit no change in characteristics or performance at temperature far in excess of 400° C. and are impervious to shock, vibration or hard radiation damage. The bistable devices are bipolar, possessing nearly complete symmetry in their current-voltage curves, with no discontinuity through the origin. The switches transit to the nonconductive state upon application of a current pulse and to the conductive state by means of a voltage pulse. These characteristics make the devices essentially immune to any damage in an electrical circuit by either voltage or current abuse, since their stable states are the extremes of open and short circuits.

Although, as indicated above, such devices can normally be rendered insensitive to ambient conditions, by specific design intent they can be made to exhibit heat, pressure, or magnetic sensitivity at highly diverse levels.

In the following discussion, a theoretical model of one inventive device is first presented in terms of its physical characteristics. Thereafter, a circuit model, based on current-voltage characteristics and negative resistance effects, is then discussed. Finally data regarding operational characteristics is indicated.

With respect to the physical model, a description of the inventive devices may be referenced in terms of order-disorder states, or order/order transitions, as briefly set forth above.

Order-disorder states are basic to an understanding of the domain theory of magnetism, to crystallography, to quantum thermodynamics, to Curie-point transitions, to coherent optics, and to the physical and electrical properties of materials. This approach is also useful in order to understand some of the properties of the new bulk effect resistive memory encompassed by the devices of the present invention.

A permanent magnet, for example, consists of minute domains, each of which behaves as a magnetic dipole, and the domains are oriented in series chains so that the net magnetic polarization is thus some function of domain polarization plus the degree of order imposed upon the aggregate of domains, i.e., the magnetic moments reinforce rather than neutralize one another.

An electret, the electrostatic analogy of a permanent magnet, also is composed of some basic building block, such as a domain, which possesses a net electrostatic polarization, manifested because of the presence of ordered electrostatic dipoles, i.e., the solid body possesses a permanent or very stable electric moment. Both electrets and magnets can be formed by imposing suitable external fields upon a suitable aggregate to cause dipole alignment with the field, and hence order. The orderliness of structure thus obtained is akin to the type of order which natural crystals exhibit at the atomic level, removed one step to the domain level.

The analogy to crystalline order is also sufficiently close to enable it to be stated that the inventive devices exhibit a corresponding type of order-disorder transition as a function of lattice energy level. Crystals exhibit different stable structural orders as a function of temperature and the transitions between one form and another are quite sharp and characteristically repeatable. These order transitions are also often accompanied by radical changes in electromagnetic characteristics, such as conductivity, dielectric constant, etc., and are suited to the revised order of the structure. Solid phase transitions from one crystal system to another, e.g., cubic to hexagonal, are also sharply characterized, and again often exhibit large electromagnetic changes.

Similarly, magnets and electrets, possessing an imposed order of the analogous "pseudocrystalline" order, also exhibit precise transition levels from order to disorder as a function of energy of the dipoles at the domain level. The point, at which net dipole forces are lost to disorder occurs at a particular vibrational energy level of the dipole domain. Thus, these sharp order transitions are energy level transitions, which will characteristically always occur when a specific amount of energy is delivered to a particular bistable switch comprising a particular quantity and type of dipoles.

Electrostatic dipoles may be formed in several ways. There are natural materials which possess polar molecules, such as water, various waxes, inorganic compounds such as Rochelle salt and the metal titanate complexes, familiar as piezoelectric devices. In these materials there is a basic asymmetry in the unit building block which makes it a natural dipole. Dipoles may also be created by doping a base metal with a trace element as is done in semiconductor technology with germanium, silicon, etc., creating a bulk material exhibiting a net N- or P-characteristic, attributable to excess electrons or holes. However, since the resulting aggregate is conductive, any electrostatic polarization in the material is short circuited by itself and is, therefore, not externally apparent. For this reason, semiconductors are not thought of in terms of dipole phenomena, despite the fact that a well-defined crystalline order is also necessary to obtain desired properties.

Thus, there are two familiar classifications for materials containing electrostatic dipoles, conductive and nonconductive. The present invention relates to a device which is a hybrid of these two classes, i.e., it is a poled electret which is conductive in one state and nonconductive in the other. The ability to change from the conductive to the nonconductive state implies the presence of positive feedback mechanisms during any transition in either direction which assures maintenance of either state as a stable entity, with or without applied power. The result is a two terminal device which, as a bulk property, reversibly changes to either a conductor or a nonconductor, and thus constitutes a resistive memory.

In a theoretical model, a minute particle of each of two dissimilar conductive materials, such as metals, are placed in ohmic contact by a high-frequency electrostatic field of a time-varying, periodic or pulse waveform. If the metals are properly chosen, that is, the number of outer orbit electrons are respectively odd and even, they will in combination exhibit a contact potential, creating an isolated electrostatic dipole and showing a net E.M.F. across the couple. If many such couples are suspended in a supporting dielectric medium, at a low enough concentration level, an ohmic conduction path through the mass is not yet present. When the composite of supporting dielectric plus metallic dipoles are additionally subjected to a simultaneously applied magnetic field, the dipoles align in orderly fashion with the impressed field in regular chains, head to tail, dipole to dipole, to produce an ordered orientation. Since the dipole constituents are themselves conductive, the chains they form will also be conductive, and the resulting device will exhibit a low resistance across it.

Such a device is more than simply a conductor whose low resistivity is an intrinsic property; its conductivity is totally dependent upon the order established within the structure by the original fields employed. If a slight rotation or disturbance of the individual dipoles is effected, conductivity is completely destroyed by the resulting breakup of the chains or order originally established. Since the chains are held together by the dipole potential established by the dissimilar metals, when this dipole potential is disturbed, the chains or order of chains no longer cling together. This disturbance is caused by applying sufficient current into the composite device to cause a voltage drop which is roughly equal to the aggregate dipole potential, thus causing the chains to relax and the device becomes essentially nonconductive.

Although a theoretical explanation, it is believed that, as the applied current reaches the value which will begin to cause the switch to "turn off," an avalanche effect, i.e., a discontinuous quantum jump, is present. As various of the conductive chains become nonconductive, the current burden is transferred to the remaining chains, causing them to transit to the open state in even more rapid sequence. This "positive feedback" mechanism assures fast switching and dependable transition of the entire device to the desired open circuit condition.

In the conductive state of the inventive device, no net electrostatic polarity in the device was found, due to self-shorting action. However, in the nonconductive state, some residual order was detected as a net electrostatic polarity in the device. It is theorized that this polarization of the mass tends to maintain all the dipoles in parallel disposition with the net field, thus holding each dipole in a stable configuration which will not of itself relax back into the conductive position.

To return the device to its conductive state, approximately one-half of the energy applied to cause the device to switch to a nonconductive state must be delivered and in a form suitable for reestablishing oriented conductive chains. Since the device is a nonconductor at this point, this energy cannot be supplied in the form of a current pulse. Thus, a voltage or potential pulse must be utilized, the energy in this instance perhaps appearing in capacitance-voltage (½ $CV^2$) form rather than in current-resistance ($I^2R$) form. However, should the device return to the conductive state under the influence of a voltage pulse, an inrush of current would occur which could cause the device to again "turn off" and to cause oscillation between the two states. Therefore, current-limiting of the reset pulse must be employed to limit energy to ½ $CV^2/2$ or to $(I^2R)/2$.

The "turn on" voltage pulse provides a sufficiently high external field first to overcome the stable self-orientation of the mass of dipoles in their "off" state and then to reorient the dipoles to their former conducting position. Since the energy required is primarily a function of the EMF exhibit by the individual dipole couple, which is a well characterized constant for the entire device, a rapid transition of all dipoles into a stable conducting state occurs once the minimum energy requirement has been met. It is believed that, as individual dipoles begin to revert to a conductive orientation, the net polarization tending to hold the remaining dipoles in the nonconductive position is weakened, thereby releasing more dipoles to the conductive position. Thus, a "positive feedback" mechanism also assists rapid and certain transition to the "on" state as well as to the "off" state. Once the mass has settled into conductive orientation, the polarization of adjacent dipoles tends to hold all dipoles stably in this position.

In the above theoretical discussion, the coefficients of thermal expansion of the dielectric media and of the active element or conductive particles are closely matched; otherwise, an additional mechanical effect would result from temperature variations which would affect operation of the device. Thus, in the fabrication of these devices, an integral temperature-coefficient compensation has been achieved through careful choice of the dielectric material used in the device fabrication so that the thermal coefficient of expansion of both active elements and dielectric medium are closely matched.

However, other embodiments of the present invention are obtained by deviation from the above criteria resulting in major changes in device performance. For example, a device having a severe thermal coefficient mismatch between constituent parts and a modification of active element criteria results in a very effective thermistor action with ultimate switching. A similar mismatch and a different active element criteria results in an effective thermocouple action. Thus, by careful choice of dielectric materials and active elements, thermal effects can be established for each device range and function.

In the above-described embodiments, it is apparent that dipole constitution and concentration is variable over a wide range with the employment of many various supporting dielectrics. Each combination possesses slightly different properties due to basic variations in intrinsic conductivity, dipole moment, dielectric constant, thermal coefficient of expansion, and other relevant factors; however, they all exhibit stable resistive states in general concurrence with the above discussion with respect to a specific embodiment relating to a bistable switch. Thus, further embodiments include devices which exhibit magnetoresistive, piezoelectric, stress/strain sensitivities, and semiconductor and other properties.

With respect to the bistable switch model described above, additional variations are obtainable. The devices are useful as memory elements for computers since retrieval of data can be accomplished nondestructively without necessitating a change between stored conductive and nonconductive states. The devices may also be utilized for amplification purposes because of the effect of a dynamic negative resistance during transition resulting from the achievement of bistability. By proper choice or load line characteristics, it is possible to cause self-oscillation at high frequencies.

In all embodiments, the presence of a bulk effect phenomenon, implying the absence of thin junctions, shows a corresponding absence of localized hot spots, immunity to junction damage of various sorts, including hard radiation, useful operation up to the "Curie transition" temperature of the material, and insensitivity to humidity, vibration shock and pressure.

The present invention may be also understood in terms of the voltage current characteristics of one embodiment, in particular, the bistable switch, and to view the switch as a special form of negative resistance device. In general, negative resistance devices have been explained by Millman and Taub in their treatise, "Pulse, Digital, and Switching Waveforms," McGraw-Hill, 1965; pp. 476–494, and the bulk effect switches of the present invention may be similarly characterized. A device may be said to possess negative resistance when, as in FIG. **9*a*, the incremental resistance over some part of its characteristic curve 120 is negative, as between points 122 and 124, where an increase in voltage causes a decrease in current. In FIG. 9*b*, a curve 126 illustrates that an increase in current causes a decrease in voltage between points 128 and 130. Millman and Taub distinguish the two types of devices having these negative resistance curves as voltage controllable and current controllable, respectively. In the plot of FIG. 9*a*, a unique, single-valued current is associated with each voltage value; however, over the range between points 122 and 124, there is more than one possible voltage for each current value. The inverse of these conditions apply to FIG. 9*b***, where a unique, single-valued voltage is associated with each value of current, but for each voltage value there is more than one possible current.

The bulk effect switch of the present invention, on the other hand, exhibits both voltage and current controllable negative resistance, i.e., both voltage and current values have corresponding multivalued currents and voltages, which are determined by the state of the device, whether ON or OFF, i.e., conductive or nonconductive. Thus, a voltage-current curve for the inventive devices is not quite as simple as the examples of negative resistance depicted in FIGS. **9*a* and 9*b* and discussed by Millman and Taub. FIGS. 10 and 11 show the relative complexity of the voltage-current curves 132 and 134 for a bistable switch embodiment of this invention is each of the stable ON and OFF states. In FIG. 10, where the switch is initially in the ON state, a transition occurs to a high impedance at point 136 when the trip current at level 138 is exceeded. In FIG. 11, where the switch is initially in the OFF state, the device will transit at point 140 to a low impedance condition and remain in this condition if the trip voltage level 142 is exceeded, provided that the actual operating current value at point 144 is below the current trip level 146 as determined by the load line 146 representing the action of current-limiting means. A composite curve 148 of curves 132 and 134 is shown in FIG. 12; but this characteristic curve is correct only if no current limiter is used thus permitting the device to continually transit or oscillate between ON and OFF. It will be noted in FIGS. 10–12** that the linear slopes intercept the V–I axes at the origin which indicates the resistive nature of the switch in the two stable states. While not shown, the V–I characteristics are also very nearly symmetrical about the origin, denoting their bipolar nature although a slight shift in ON resistance is generally observed in the third quadrant. If neither the current trip or voltage trip levels are exceeded, the device will symmetrically track one or the other of the stable resistance slopes through the origin in either direction, depending on the initial state of the device.

The circuit techniques for dealing with generalized negative resistance devices, as discussed in Millman and Taub, are useful for obtaining an initial understanding of the two terminal device configurations of the present invention. These techniques show that any negative resistance device may be employed as a switching element in monostable, astable or bistable modes by design choice; however, this background discussion applies only to actively stable states, whereas the bulk effect switch of the present invention is stable both actively and passively.

As is apparent from the above discussion, the invention as embodied in a bistable switch is capable of stably maintaining either of two impedance states. These states are stable for any length of time, with or without power applied, and in either state are completely bipolar since the switch's I–V characteristics are symmetrical about the origin. The basic functioning of the switch involves a low-impedance state and a high-impedance state. These two states differ greatly in magnitude, the real components differing by as much as seven orders of magnitude ($10^7$). It has a very small reactive component, consisting of capacitance in the order of a few picofarads, and is usually quite stable. A change from its low impedance state to its high-impedance state requires that a critical current level be exceeded as indicated by level 136 of FIG. 10. Return from a high to a low-impedance state requires that a voltage pulse, at a level at least as high as level 142 indicated in FIG. 11, be applied to the device. It is thus obvious that the voltage pulse must be current limited, as illustrated by the difference between levels 144 and 146 of FIG. 11, so as not to exceed the critical current of the low impedance state.

The current impedance characteristics of a group of switches comprising differing amounts of the same conductive particles is depicted in FIG. 13. Depending upon the percentages of the particles, a particular resistance provided a specific current at which the switch became nonconductive. For various percentages of conductive particles, it was possible to construct a typical curve 150 for this group of switches. For example, one specific switch was constructed to have a low impedance of 5 ohms. By drawing a vertical line 152 to intersect curve 150 at point 154, it was possible to obtain the current at which the switch would become nonconductive. In this example, the current was 200 milliamperes and was verified by drawing a dashed line 156 to the particular value of current. It is obvious that other designed resistances will produce other values of trip current.

For the group of switches having the current impedance curve of FIG. 13, a series of curves 158 may be drawn as illustrated in FIG. 14. This group of switches will become nonconductive whenever the voltage across the switch exceeds 1 volt. Thus, line 160 is representative of the 5 ohm switch which will trip at 200 milliamperes. This switch is capable of maintaining a current less than that of its trip current indefinitely or of remaining in its conductive state without power applied and then exhibiting the same conductive state characteristics when power is reapplied. Similarly, if the switch were in its high-impedance condition, it will remain nonconductive with the power off and will exhibit the same nonconductive characteristics when power is reapplied.

Such a bistable switch may be used in a circuit such as depicted in FIG. 15 for current-responsive control of an undisclosed function of an apparatus. A switch 162 of this invention which is current conductive in its ON state is connected in series with an electronic circuit 164 and maintains operation of the circuit for normal circuit conditions. If the electronic circuit 164 operating conditions change to an extent which results in an increase in current flow through the switch 162 to a valve above a predetermined maximum, the trip-point of the switch, the switch trips to its OFF state and thus opens the electronic circuit network. The switch is preferably selected to have a resistance in the ON state of the order of 10 ohms, effectively a short-circuit, but will have such a large resistance in the OFF state as to effectively prevent further flow of current in the circuit 164 with respect to the switch.

A selectively operable reset circuit is also provided for reset of the switch 162 from its OFF state to the ON state. The switch 162 is connected in series with a current limiting device 166, such as a gas tube or neon lamp, and a secondary winding 168 of a transformer 170. The purpose of the device 166 is to prevent inclusion of the resetting mechanism into the electronic circuit. The primary winding 172 of the transformer may be connected in series with a capacitor 174 through a single-pole, double-throw switch 176 which will result in discharge of storage energy from the capacitor through the primary winding resulting in the application of a relatively high-voltage pulse to the switch 162 to effect the reset operation. Charging of the capacitor 174 is accomplished through operation of the switch 176 to connect the capacitor in series circuit with a direct current power source 178. Positioning of the switch 176 as shown in FIG. 15 results in charging of capacitor 174 and subsequent actuation of this switch to the other position results in discharge of the capacitor through the primary winding 172.

It will be understood that the power source 178, capacitor 174 and transformer 170 are selected to provide a sufficiently large voltage pulse to effect resetting of the specific bistable switch 162 utilized in a particular circuit.

Multiterminal versions of the basic bistable switch may be constructed by the addition of one or more auxiliary contacts (contacts in addition to the two primary circuit terminals) spaced about the switch element. Such a multiterminal version of the switch device exhibits controllable trip-level characteristics within the range of the trip-level characteristics of the two constituent switches. A switching device 195 provided with three terminals, two of which are the previously described load circuit terminals and the third being the auxiliary contact, is diagrammatically illustrated in FIG. 17. The switching device is formed with the previously discussed primary circuit terminals 196 and 197 which form an ohmic contact with opposite ends of the main body of the device and are series connected with a load 198 represented by the resistor symbol and a battery-type power source 199. Control over current flow through the load 198 is effected by placing the switching device 195 in either an ON or OFF current conducting state, either of which is a stable condition. Switching of the device from either of the stable ON or OFF state is effected by a control circuit 200 having an output terminal 201 and operable to provide a reset voltage pulse $V_c$ or a trip current pulse $I_c$ for switching of the device from one stable operating state to the other. Connection of the output terminal 201 to the switching device is made through a point contact 202 or gate terminal attached to the main body of the device and a ground connection 203 to the power or load circuit. Diodes 204 and 205 are connected in the load and control circuits to provide the necessary isolation of the respective circuits. The load circuit is designed so that the load current Ic is less than the trip current $I_t$ and the voltage drop across the device 195 will be less than the reset voltage $V_r$ to provide stable operation of the switching device in either the ON or OFF state. Through appropriate design of the control circuit 200, a reset voltage pulse $V_c$ may be applied to the device which when combined with the voltage drop across the device, essentially the load circuit power source voltage Ep in the stable OFF state, exceeds the reset voltage $V_r$ of the device and switches the device to the stable ON state. Similarly, the control circuit 200 may be operated to provide a trip current pulse $I_c$ which when combined with the load current I when the device is in the stable ON state will exceed the trip current $I_t$ of the device and switch the device to the stable OFF state. While FIG. 17 illustrates direct current power control, multiterminal switch devices may also be effectively utilized in alternating current power control.

FIG. 18 diagrammatically illustrates a four terminal switching device 210 having pairs of terminals 211 and 212 and 213, 214 connected to respective load and control circuits. The load circuit terminals 211 and 212 are as previously described while the control circuit terminals 213 and 214 are of the body contact type although they may be of the point contact type as in the illustrated three terminal device of FIG. 17. Operation and control of this four terminal device is substantially the same as the device of FIG. 17.

Other switches, including the two-terminal and multiterminal switches may be controlled in each critical parameter since the performance of a specific switch is determined by the materials chosen, the particle size of the materials, and the relative proportions of each material. Such critical parameters include the dynamic range between the high- and low-impedance states, the particular values of resistance during conductivity and nonconductivity, the transition time of switching, the "turn off" current and "turn on" ratings, the size of switches, the capacitance and the operating temperatures. Thus, a switch possessing a 200-milliampere trip current rating can be specified as 50 mils thick, 200 mils diameter, having a 250 v. reset level, and operable in circuits at a continuous circuit voltage of 60 volts and continuous current rating of 100 ma. without changing state. The stable impedance levels of the device will be approximately 5.0 ohms and 50 megohms, and its switching speed is submicrosecond. Smaller devices generally require less trip current, but reset voltage is primarily a function of dipole concentration level. The reset power is generally proportional to current rating and in the above device, a 200 mw. pulse for proper reset is required. Both set and reset pulses can generally be handled by conventional semi-conductor circuitry, since the integrated energy-time characteristic of these pulses $(I^2R)/T$ through a semiconductor junction before the device will change state is well within the capabilities of most transistors and the like due to the extremely fast (submicrosecond) transition time of the switch.

A current-limiting device may also be used as a squib which comprises a switch having an explosive charge. During manufacture, the switch is prepared so that it will be fabricated in its nonconductive state. When placed in operation, a first voltage pulse of sufficient magnitude places the switch in its conductive state. A second current pulse then ignites the explosive charge of the squib. Such a squib 184 is depicted in FIG. 16 and is selectively connectable to a capacitor 186 through a movable switch contact 190 when the switch contact is disposed in engagement with contact 190*a* or 190*c*. The capacitor 186 is connectable to a suitable power supply 188 when the switch contact 190 is disposed in engagement with contact 190*b* for charging of the capacitor. When it is desired to explode the squib 184, the switch contact 190 is initially positioned to close the capacitor-power supply circuit to charge the capacitor 186. Then the switch contact 190 is repositioned to open the capacitor-power supply circuit and to complete the capacitor-squib circuit through engagement with contact 190*a*. The capacitor 186 discharges through a current limiting resistance 192 to supply electrical energy to order the orientation of the squib with a low resistance. The resistance 192 is of a sufficiently high magnitude to limit current flow during orientation to a value which is well below that necessary to effect ignition of the explosive charge. A subsequent charging of the capacitor 186 and discharge through engagement of contact 190 with 190*c* results in a large current flow through the squib 184 which ignites the explosive charge.

As an example, a squib, including 30 percent black gunpowder, 10 percent antimony sulfide, 5 percent barium dioxide, and 15 percent cobalt in addition to matrix materials is designed to have a resistance of 300,000 ohms, in effect, an infinite resistance. Thus, any leakage from the power supply or capacitor will not discharge the squib. Upon appropriate movement of switch contact 190, the capacitor 186 is charged until it attains a predetermined potential level which is sufficient to cause a transition wherein the internal high resistance of the squib will drop to a resistance of about 1/1000 ohms. The presence of the resistance 192 limits current flow during orientation to prevent inadvertent, premature firing. Subsequent recharge of the capacitor 186 and reconnection with the squib 184 to bypass the resistance 192 results in a relatively high current flow which ignites the squib. At this point, the internal resistance of 1/1000 ohms permits 2,000 amperes to flow in a period of 1 microsecond. This process occurs when 1,000 volts is applied to a squib having no radioactive oxide particles. If a small amount of thorium oxide, for example, were added to the squib, then a substantially smaller voltage would be required.

It will be readily apparent from the foregoing detailed description and illustration of several embodiments of this invention that a novel solid-state current limiting device has been disclosed which is capable of switching between conducting and nonconducting current states. In one embodiment, the devices are responsive to a circuit condition to switch from a conducting to a nonconducting state but may be repetitively reset to the current conducting state by the application of an electrical signal. The devices of this invention are capable of relatively rapid switching between the two states with the speed being at least of an order within the nanosecond range. The devices may also be fabricated to be stable in either conductive state or to be stable in only the current conducting state with a quantity of particles of a radioactive material included to provide automatic resetting capability.

What is claimed is:

1. A solid-state device comprising a plurality of ordered dipoles supported within a dielectric matrix;

each of said dipoles comprising a pair of electrically conductive particles, one of said pair consisting of an element selected from the group of elements of the Periodic Table having an even number of electrons in its outer shell and having a magnetic moment, and the other of said pair consisting of an element selected from the group of elements of the Periodic Table having an odd number of electrons in its outer shell.

2. A device as in claim 1 having a bulk resistance wherein the ratio of one of the conductive particles to the other of the conductive particles determines the bulk resistance of the device.

3. A device as in claim 1 further including a radioactive material supported within the matrix.

4. A device as in claim 3 wherein the specified percentage of the radioactive material is at most one-tenth percent to form a resettable switch.

5. A device as in claim 3 wherein the specified percentage is at least 1 percent and at most 3 percent to form an automatically resettable switch.

6. A device as in claim 3 wherein the radioactive material is selected from the compounds consisting of thorium, uranium, polonium and cobalt.

7. A device as in claim 1 wherein the one conductive particle is selected from the group consisting of cobalt, nickel and iron and wherein the other conductive particle is selected from the group consisting of aluminum, silver, copper, platinum, gold, cesium, palladium, rubidium and ruthenium.

8. A resettable switch as in claim 1 comprising a combination of cobalt and silver supported in a dielectric matrix of glass.

9. A switch as in claim 8 wherein said combination consists of 98 parts of cobalt to 2 parts of silver and wherein the ratio of said combination to said matrix consists of 25 parts of said combination to 75 parts of said matrix.

10. A switch as in claim 9 wherein said combination further includes radioactive thorium oxide having a ratio consisting of 1 part of thorium oxide to 99 parts of silver and cobalt.

11. A solid-state resistance device comprising a plurality of dipoles supported within a dielectric matrix and having the same orientation, each of said dipoles comprising a pair or electrically conductive particles, one of said pair consisting of an element selected from the group of elements of the Periodic Table having an even number of electrons in its outer shell and having a magnetic moment and the other of said pair consisting of an element selected from the group of elements of the Periodic Table having an odd number of electrons in its outer shell.

12. A device as in claim 1 wherein said dipoles possess a specified resistance and said matrix comprises a deformable material to permit a change in the resistance upon application of pressure to said device.

13. A device as in claim 1 wherein said dipoles possess a specified resistance and said matrix comprises a temperature-sensitive material to permit a change in the resistance upon change of temperature.

14. A device as in claim 13 wherein said matrix comprises quartz and a thermally positive resistance material selected from the compounds consisting of aluminum oxide and silicon carbide.

15. A device as in claim 1 having a first pair of electrically discrete contact terminals disposed in mechanical engagement with the dielectric matrix and at least one electrically discrete auxiliary contact terminal disposed in mechanical engagement with the dielectric matrix, said first pair of contact terminals providing a load circuit connection to the device for current conduction therethrough and said auxiliary contact terminal provides means for application of a control signal to the device to effect switching thereof between electrically conductive and nonconductive states.

16. A device as in claim 15 having at least one other electrically discrete auxiliary contact terminal disposed in mechanical engagement with the dielectric matrix, said one other auxiliary contact terminal providing means for a control signal to the device to effect switching thereof independently of or in cooperation with said first-mentioned auxiliary contact terminal.

* * * * *

UNITED STATES PATENT OFFICE
CERTIFICATE OF CORRECTION

Patent No. 3,648,119 Dated March 7, 1972

Inventor(s) Philippe F. Van Eeck

It is certified that error appears in the above-identified patent and that said Letters Patent are hereby corrected as shown below:

Column 10, line 48, cancel "5" and substitute therefor

--4--.

Insert at line 35, column 11 for notation "0010 NO CARD FOR THIS ILLUSTRATION.", the following table:

| Conductive Particles 40% cobalt-60% silver | Matrix Ceramic | Power Rating Amperes | Resistance Ohms |
|---|---|---|---|
| 40% | 60% | 0.2 | 5 |
| 50% | 50% | 0.4 | 2.5 |
| 55% | 45% | 1 | 1 |
| 75% | 25% | 4 | 0.25 |

When aluminum replaced silver, the power rating and resistance changed slightly since aluminum is less conductive than silver Column 11, line 74, cancel "a" and substitute therefor --and--.

Column 16, line 41, cancel "is" and substitute therefor

--in--.

Signed and sealed this 26th day of September 1972.

(SEAL)
Attest:

EDWARD M. FLETCHER, JR.
Attesting Officer

ROBERT GOTTSCHALK
Commissioner of Patents